United States Patent [19]

Bueschel et al.

[11] Patent Number: 4,811,633

[45] Date of Patent: Mar. 14, 1989

[54] ADJUSTABLE WIRE STRIPPING APPARATUS

[75] Inventors: David M. Bueschel, Menomonee Falls; Kenneth A. Wollermann, Mukwonago, both of Wis.

[73] Assignee: Artos Engineering Company, New Berlin, Wis.

[21] Appl. No.: 151,013

[22] Filed: Feb. 1, 1988

[51] Int. Cl.$^4$ .............................................. H02G 1/12
[52] U.S. Cl. ..................................... 81/9.51; 29/566.1
[58] Field of Search .............. 81/9.51; 29/566.1, 564.4

[56] References Cited

U.S. PATENT DOCUMENTS

| | | | |
|---|---|---|---|
| 3,176,550 | 4/1965 | Marcotte | 81/9.51 |
| 4,364,289 | 12/1982 | Sorenson | 81/9.51 |
| 4,584,912 | 4/1986 | Gudmestad et al. | 81/9.51 |
| 4,601,093 | 6/1986 | Cope | 81/9.51 |
| 4,614,135 | 9/1986 | Ito et al. | 81/9.51 |

*Primary Examiner*—Frederick R. Schmidt
*Assistant Examiner*—Lawrence Cruz
*Attorney, Agent, or Firm*—James E. Nilles

[57] ABSTRACT

A programmable apparatus for automatically stripping insulation from a wire end being conveyed by a wire conveyor, thereby leaving a portion of exposed conductor. This apparatus includes an insulation cutting mechanism for transversely cutting the insulation. The cutting mechanism includes opposed blades having facing cutting surfaces, at least one of those blades being movable toward the other by a blade closure device. To effect stripping, the cutting mechanism is moved away from the wire end after the cut is made. The apparatus includes a stepper motor for adjusting for the size of the wire and the thickness of the insulation. Another stepper motor is provided to control the length of the stripped portion. As the cutting mechanism is moved, a blade holder holds the cutting blades in position. A slider rod is connected to the holder and slidably engaged in a support frame connected to the conveyor. A cam is connected to the slider rod by a first cam follower and rotatably connected to the support frame for moving the slider and thus the blade holder to any one of a number of predetermined positions as required to effect stripping of the wire end. Finally, a prime mover is provided for rotating the cam respective to the support frame, thus actuating the stripping mechanism. A stop latch is provided for stopping the rotation of the cam at a predetermined zero position of the cam rotation.

8 Claims, 7 Drawing Sheets

ADJUSTABLE WIRE STRIPPING APPARATUS

BACKGROUND OF THE INVENTION

This invention relates to wire processing apparatus, and in particular to such apparatus that are provided for stripping insulation from wire, and for automatic control of the length of the stripped wire end and automated compensation for the size of the wire being processed.

Generally, wire processing apparatus such as that disclosed in the Dusel et al U.S. Pat. No. 4,649,621, include stations for carrying out various steps in the process of converting spools of wire to terminated wire leads. These steps may include cutting the wire to predetermined lengths, stripping the insulation from one or both ends of the wire, tinning or applying solder to the stripped wire ends, and applying terminal connectors.

Various devices have been provided for accomplishing these steps, and particularly referring to the step of stripping the insulation from the wire. For instance, the Andren U.S. Pat. No. 2,871,740, shows an early apparatus for automatically stripping a hand-fed wire. Another example of an apparatus for stripping wire leads is shown in the Gudmestad U.S. Pat. No. 4,194,281.

In both of these cases, however, extensive adjustments were required to be made manually whenever it was desired to change the type of wire if such change had the effect of changing the thickness of the insulation or of the conductor itself, or if it was desired to change the length of the portion of wire end which was stripped. This manual adjustment procedure resulted in substantial down time and lost production, both because of the time required to make the adjustment and because of the inexactness of the adjustment itself, which required readjustment until the setting was within predetermined tolerances. Hence, while automatic alteration of these parameters had always been desirable, such automatic control has not been accomplished by prior art devices.

This invention relates to improvements over existing apparatus as set forth above and to solutions to the problems raised thereby.

SUMMARY OF THE INVENTION

The invention provides for a programmable apparatus for automatically stripping insulation from a wire end being conveyed by a wire conveyor, thereby leaving a portion of exposed conductor. This apparatus includes insulation cutting means for transversely cutting the insulation. The cutting means includes opposed blades having facing cutting surfaces, at least one of those blades being movable toward the other by blade closing means. Thus is effected transverse cutting of the insulation. The invention further encompasses insulation moving means for axially moving the now-cut insulation relative to said conductor to effect stripping, or removal of the insulation from the end of the wire. This insulation moving means also includes means for moving the cutting means toward the wire end and positioning the wire end between the blades, besides moving the cutting means away from the wire end after the blades have been closed on the wire end and the insulation has been cut, for effecting stripping of the wire end. Depth control means are provided for controlling the depth to which the cutting means cuts the insulation. That is, means are provided to respond to and adjust for the size of the wire and the thickness of the insulation. Further, length control means are also provided for controlling the length of the cut portion. In a preferred embodiment, the means for moving the cutting means includes a blade holder for holding the cutting blades in position, a slider rod connected to the holder and slidably engaged in a support frame connected to the conveyor, and a cam connected to the slider rod by a first cam follower and rotatably connected to the support frame for moving the slider and thus the blade holder to any one of a number of predetermined positions as required to effect stripping of the wire end. Finally, a prime mover is provided for rotating the cam respective to the support frame, thus actuating the stripping mechanism. Stop means are provided for reliably stopping the rotation of the cam at a predetermined zero position of the cam rotation, as are of course means for releasing the stop means to allow the cam to rotate.

The cam comprises a disk rotatably attached to the support frame and having two cam surfaces, one on each side thereof. One cam surface is connected by a first cam follower to the slider, for moving the blade holder toward and away from the wire end to be stripped. The other cam surface is connected by a second cam follower to a V-shaped ramp which, as the ramp moves toward the blade holder. The blades within the blade holder, which are normally biased apart, are thus caused to move together, cutting into the insulation. The depth to which the insulation is cut is determined by an adjustable relation between the first cam follower and the slider rod. Hence, to control the depth of cut of the blades, the relation between the first cam follower and the slider rod is adjusted by a servo motor. The body of the servo motor is attached to either the rod or the cam follower, and the shaft of the motor is threadedly attached to the other of the two. Accordingly, when the motor causes the shaft to turn, the relation between the first cam follower and the slider rod is changed, resulting in a change in the smallest spacing between the blades. This in turn leads to a change in the depth to which the insulation is cut by the blades, or alternatively to an adjustment for the size of the conductor so that the insulation is completely cut without cutting the conductor.

The support frame is connected to the conveyor by means of a base. The connection between the support frame and the base is a slidable connection. The length control means includes means for sliding the support frame with respect to the base.

Other objects and advantages of the invention will become apparent hereinafter.

DESCRIPTION OF THE PREFERRED EMBODIMENTS

Figures 1, 14:
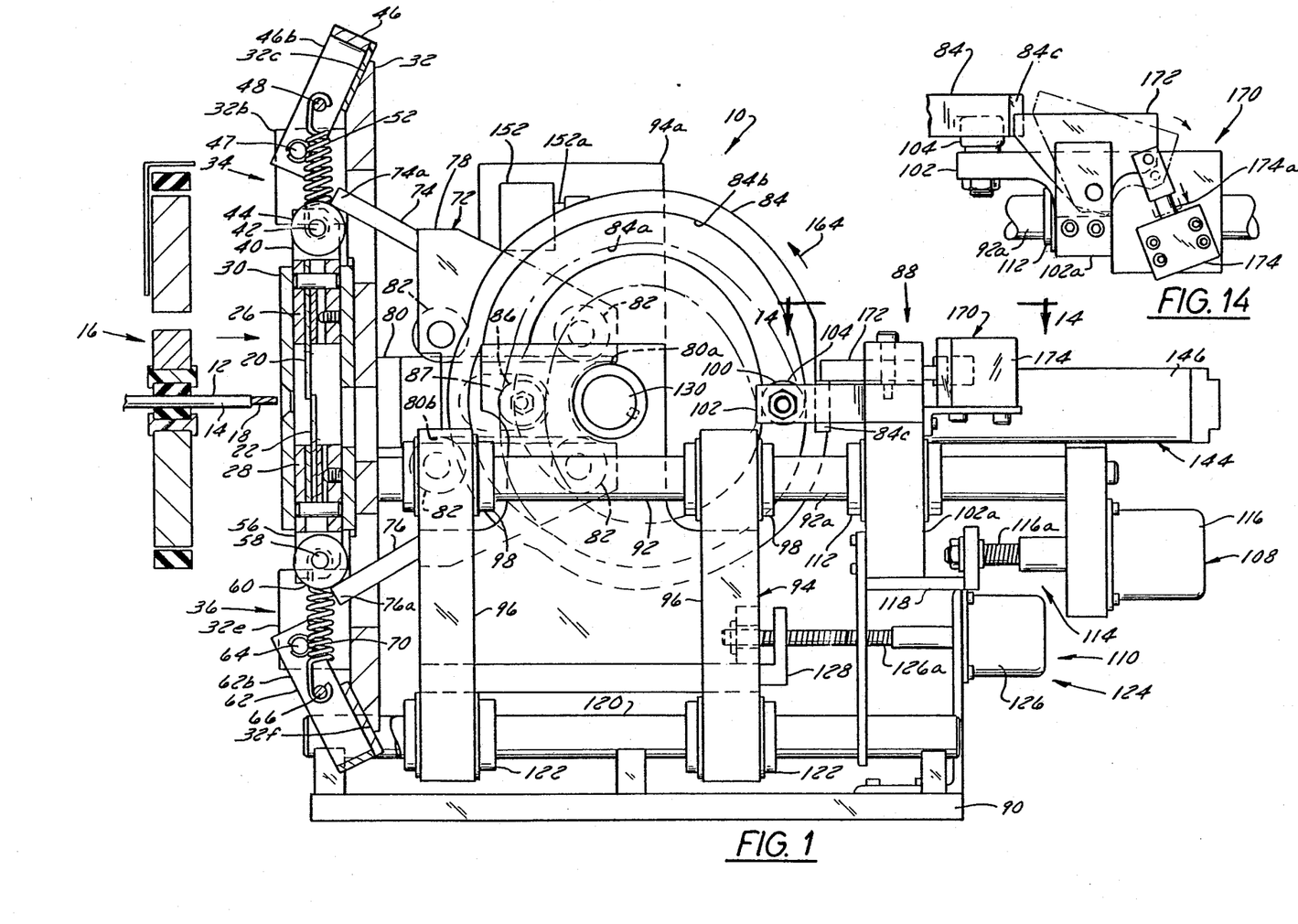
FIG. 1 is a side view, partially in section, of an apparatus constructed according to a preferred embodiment of the invention.
FIG. 14 is an enlarged view of a mechanism for stopping the rotation of the cam disk at a predetermined zero point.

Referring now to FIG. 1, there is shown an apparatus 10 for stripping an insulated wire 12 of its insulation 14, the wire 12 being held by a conveyor 16. This stripping operation exposes a conductor 18 within the wire 12. The conveyor 16 carries the wire 12 to a position in front of and facing the apparatus 10. In the preferred embodiment shown in FIG. 1, the apparatus includes a pair of facing knives, an upper knife 20 and a lower knife 22. As can be seen by comparing FIG. 2 to FIG. 1, each knife 20 and 22 includes a cutting edge 20a and 22a which is V-shaped, and in which the legs of the "V" of each cutting edge face toward and overlap with the legs of the "V" of the opposite cutting edge, leaving a diamond-shaped opening 24 between the two cutting edges. As will be explained subsequently the blades 20 and 22, in an open position, are moved toward and onto the insulated wire 12 for stripping by the cutting edges 20a and 22a. The blades 20 and 22 are then moved toward each other to a predetermined spacing depending upon the gauge of the wire 12, to cut the insulation 14 transversely. Once the insulation 14 is cut, the blades, held in the closed position, are moved away from the wire 12, in the process pulling the insulation off and exposing the conductor 18 within.

Knives and Holder Apparatus

Each of the knives 20 and 22 is held by a respective blade carrier. That is, upper knife 20 is held by an upper blade carrier 26 while lower knife 22 is held by a lower blade carrier 28. Both blade carriers 26 and 28 ride in a single vertically oriented channel 30 via any suitable bearing means. In the preferred embodiment presented here, a plain bearing or slip fit is used. The channel 30 is supported by and connected to the front surface of a blade holder plate 32, the support of which will be set forth subsequently.

Figure 2:
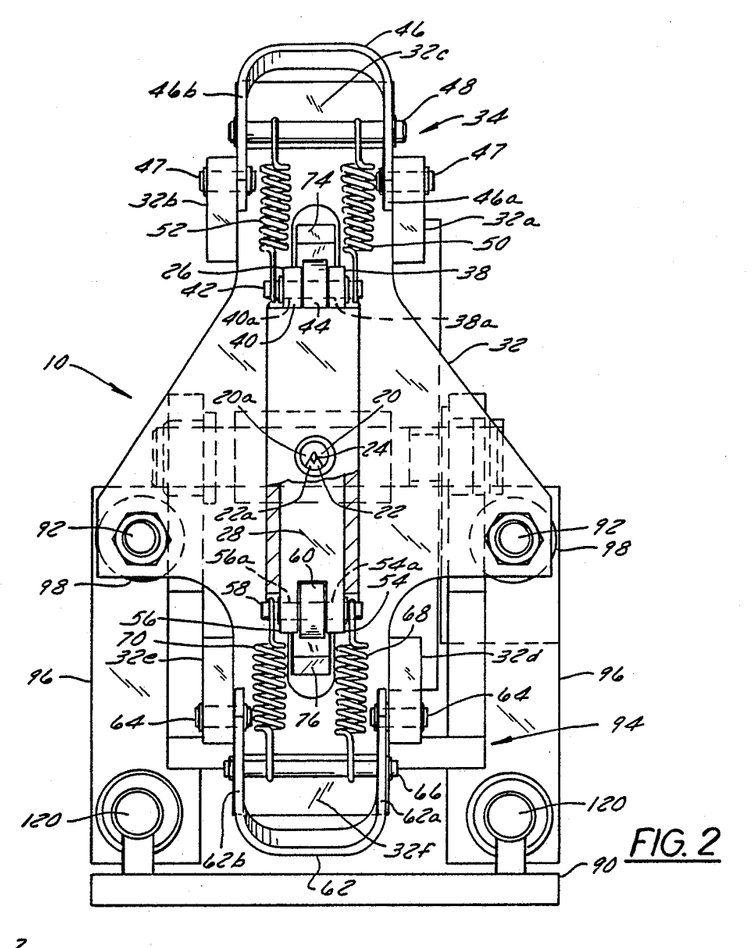
FIG. 2 is an end view of the apparatus shown in FIG. 1.

The blade carriers 26 and 28, and hence the blades 20 and 22 themselves, are biased away from each other by suitable upper and lower biasing means 34 and 36 respectively. In the preferred embodiment, the upper biasing means 34 includes a pair of parallel, spaced apart and upstanding ears 38 and 40 connected to or preferably formed integrally with the upper blade carrier 26. The ears 38 and 40 each have an aperture 38a and 40a formed transversely therethrough, the apertures of the two ears being aligned with each other. An upper spring pin 42 is inserted through the two apertures 38a and 40a. The length of pin 42 is great enough that it extends beyond both ears 38 and 40, as shown in FIG. 2. Located between the ears 38 and 40, and also having pin 42 inserted therethrough, is an upper bearing means, such as a roller 44. A U-shaped spring lever 46 is pivotably attached at the ends of its legs 46a and 46b, via pivots 47, to a pair of shoulders 32a and 32b which are attached to and project outward from the blade holder plate 32 at a point above the pin 42. An upper lever pin 48 is connected between the two legs 46a and 46b at a point between the cross bar of the U-shaped lever 46 and the pivots 47. A pair of biasing springs 50 and 52, each having hooked ends, are hooked between the lever pin 48 and the spring pin 42, preferably in grooves provided for that purpose at the ends of the respective pins. As shown best in FIG. 1, the shoulders 32a and 32b of the blade holder plate project outward further than the channel 30. This provision, combined with a stop 32c located at the very top of the blade holder plate 32, results in an over-center feature, wherein the lever 46 being pulled upward by a human operator (not shown) urges the upper carrier 26 upward via the biasing springs 50 and 52. When the lever pin 48 passes the pivots 47, the lever 46 is urged toward the blade holder plate 32 and into contact with the stop 32c. Once in such contact, the springs 50 and 52 hold the lever 46 against the stop and continue to bias the upper blade carrier 26 upward.

Similarly, the lower biasing means 36 includes a pair of parallel, spaced apart and downwardly projecting ears 54 and 56 connected to or preferably formed integrally with the lower blade carrier 28. The ears 54 and 56 each have an aperture 54a and 56a formed transversely therethrough, the apertures of the two ears being aligned with each other. A lower spring pin 58 is inserted through the two apertures 54a and 56a. Pin 58 is long enough that it extends beyond both ears 54 and 56, as shown in FIG. 2. Located between the ears 54 and 56, and also having pin 58 inserted therethrough, is another bearing means, such as a lower roller 60. A U-shaped lower spring lever 62 is pivotably attached at the ends of its legs 62a and 62b, via pivots 64, to a pair of shoulders 32d and 32e which are attached to and project outward from the blade holder plate 32 at a point below the pin 58. A lower lever pin 66 is connected between the two legs 64a and 64b at a point between the cross bar of the U-shaped lever 62 and the pivots 64. A pair of biasing springs 68 and 70, each having hooked ends, are hooked between the lever pin 66 and the spring pin 58, preferably in grooves provided for that purpose at the ends of the respective pins. As shown best in FIG. 1, the shoulders 32d and 32e of the blade holder plate project outward further than the channel 30. Similar to the upper biasing means 34, this provision, combined with a stop 32f located at the very bottom of the blade holder plate 32, results in an over-center feature, wherein the lever 62 being pulled downward by a human operator (not shown) urges the lower carrier 28 downward via the biasing springs 68 and 70.

When the lever pin 66 passes the pivots 64, the lever 66 is urged toward the blade holder plate 32 and into contact with the stop 32f. Once in such contact, the springs 60 and 70 hold the lever 66 against the lower stop 32f and continue to bias the lower blade carrier 28 downward.

Blade Closing Means

As indicated above with respect to FIGS. 1 and 2, the rollers 44 and 60 are mounted on their respective spring pins 42 and 58. These mountings are rotatable mountings, such that rollers 44 and 60 are rotatable with respect to blade holder plate 32. In fact, rollers 44 and 60 constitute ramp bearing means, as will now be set forth. As described, the blade carriers 26 and 28 are biased apart. In order to accomplish stripping of the insulation from the wire 12, the cutting edges 20a and 22a of the blades 20 and 22 are closed by blade closing means 72 shown in FIGS. 1 through 4, and particularly FIG. 4. This blade closing means 72 includes an upper ramp 74 and a lower ramp 76, both attached at their proximal ends to a single ramp carrier 78, with upper ramp 74 located directly over lower ramp 76. The upper ramp 74 is affixed to a lower portion of ramp carrier 78 in a position such that its distal end 74a extends diagonally forward and upward, and its underside contacts the top of upper roller 44. Similarly, lower ramp 76 is affixed to a lower portion of ramp carrier 78 in a position such that its distal end 76a extends diagonally forward and downward, and its upper side contacts the bottom of lower roller 60. A carrier support 80 is attached at about the center of the blade holder plate 32 and extends perpendicularly away from the side of the plate 32 opposite channel 30, that is, the back side of the plate. Ramp carrier 78 rides on carrier support 80 by means of bearing means such as rollers 82 rotatably attached to the carrier 78. These rollers 82 in turn ride in tracks 80a and 80b formed on the upper and lower surfaces respectively of the support 80.

Figure 5:
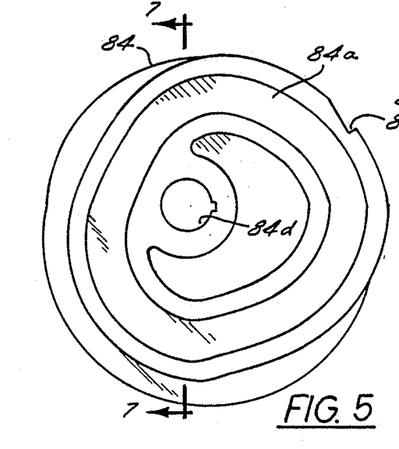
FIG. 5 is a side view of a cam disk employed in the apparatus shown in FIG. 1, showing one of the cam surfaces of the disk.

In order to move the blades 20 and 22 together, that is, to close the blades, the carrier 78 is moved toward the plate 32 by a cam channel 84a of a cam disk 84. The cam channel 84a acts on a blade-closing cam follower 86, which in this case is shown in the form of a wheel 87 rotatably attached to the carrier. The cam disk 84 and the shape of this cam channel 84a are shown in FIG. 5. As can be seen in FIG. 5, the distance of the channel 84a from the cam disk hub 84d is different for the different positions of the channel. Thus when cam disk 84 is rotated by a suitable prime mover, the carrier 78, and hence the ramps 74 and 76, move with respect to the blade holder plate 32 and hence with respect to the rollers 44 and 60. This causes the rollers 44 and 60 to move toward each other, which in turn causes the blades 20 and 22 to move together, as desired. Automatic control of the extent of this movement toward each other by blades 20 and 22 will be set forth later in this description.

Blade Movement Means

Figure 3:
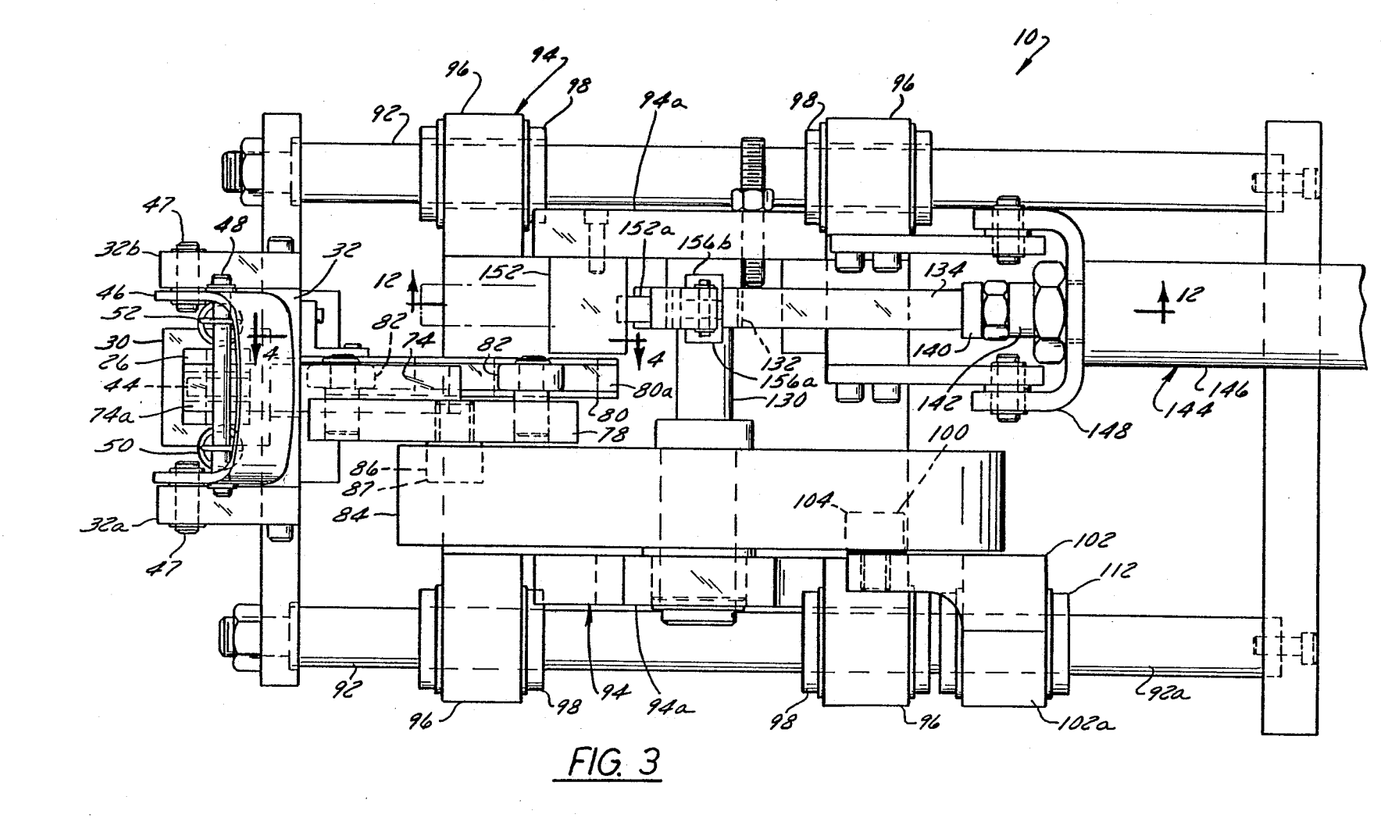
FIG. 3 is a top view of the apparatus shown in FIG. 1.
Figure 4:
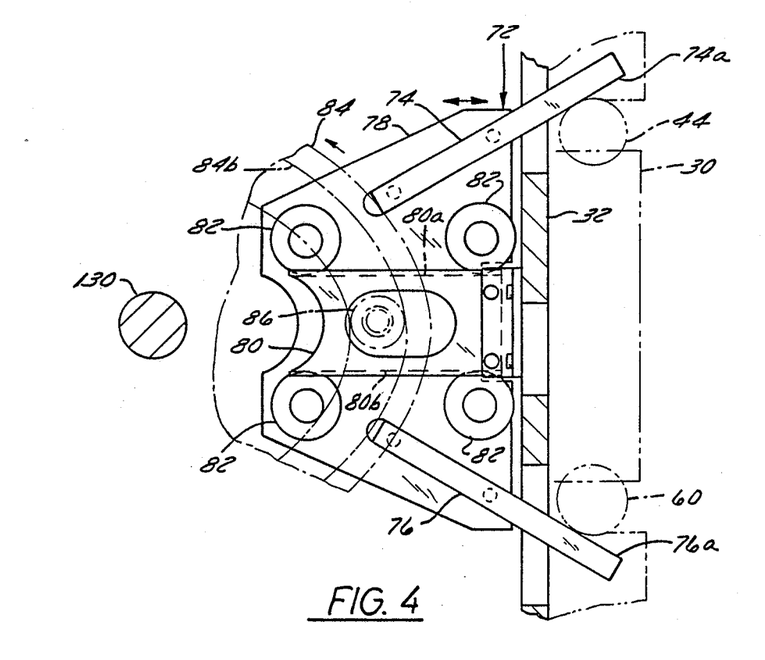
FIG. 4 is a cross-sectional view of the apparatus shown in FIG. 3, taken generally along line 4—4, showing a blade closing means constructed according to one embodiment of the invention.

Referring now mostly to FIGS. 1 and 3, the blades 20 and 22 are moved toward the wire 12 by blade movement means 88, which supports the plate on a base 90 and moves the blades with respect to that base. In the preferred embodiment, blade movement means 88 includes a pair of slider rods 92 bolted or otherwise attached perpendicular to the back side of the plate 32, and generally parallel to the carrier support 80. Each of the rods 92 is slidably mounted in a frame 94, which is formed by a total of four uprights 96. Each of the rods 92 is axially slidably mounted in aligned holes bored transversely in the top ends of two of the uprights 96. Bearing means such as bushings 98 may be provided within the holes bored in the uprights 96 to improve the sliding motion of the rods 92 with respect to the uprights. A blade-moving cam follower 100 is coupled to one rod 92a of the slider rods 92 by a coupling arm 102. Again in this case the cam follower 100 is a wheel 104 rotatably attached to the coupling arm 102. Cam follower 100 is acted upon by a cam channel 84b on the opposite side of cam disk 84 from the cam channel 84a referred to above in the description of the blade closing means 72, as the cam disk is rotated as described earlier.

Figures 6, 7:
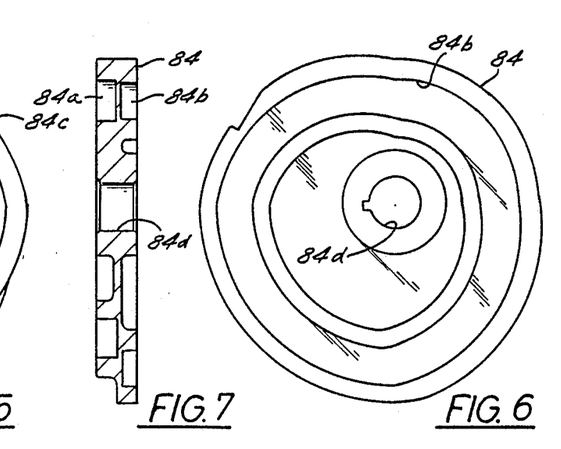
FIG. 6 is a side view of the cam disk shown in FIG. 5, showing the opposite cam surface of the disk.
FIG. 7 is a cross-sectional view of the cam disk shown in FIG. 5, taken generally along line 7—7.

The shape of cam channel 84b can be seen by reference to FIG. 6. FIG. 7 shows a cross sectional view of the cam disk, confirming that the cam channels 84a and 84b are formed in opposite sides of the same cam disk 84.

Operation

Rotation of the cam disk 84, then, causes two types of movement. One of the movements is a lateral-movement of the blade holder plate 32, and thus blades 20 and 22, toward and away from the wire 12, so as to bring the blades 20 and 22 into position to cut the insulation 14 and, once cut, to pull the insulation off the conductor 18. The second type of movement, caused by the same rotation of the cam disk, is the closing and opening of the blades to effect the transverse cutting of the insulation 14 itself. This entire operation, including both types of movement, will now be explained in detail.

Figure 8:
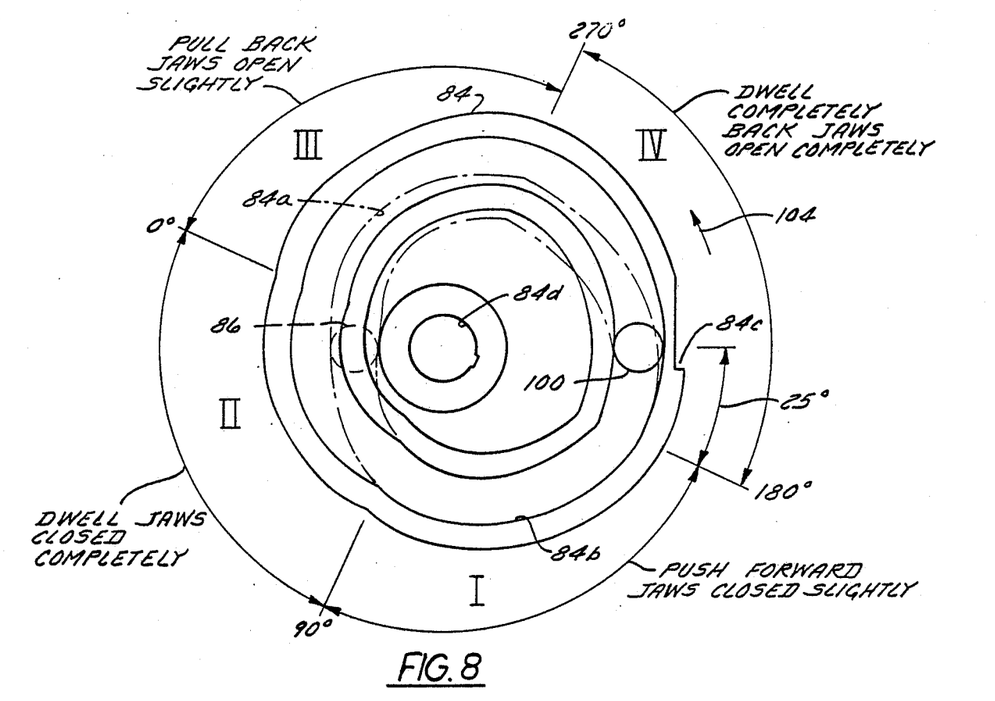
FIG. 8 is a side view, partially schematic, showing both cam surfaces of the cam disk in relation to cam followers according to one embodiment of the invention.

The relationship between the cam channels 84a and 84b can be seen by reference to FIG. 8, a partially schematic view of the cam disk 84. In that figure, the cam channel 84b which acts on the blade-moving cam follower 100 is shown in solid lines while the cam channel 84a which acts on the blade-closing cam follower 86 is shown in broken lines. The zero position of the cam disk, that is, the position from which the cam disk begins any cycle, is indicated by a stop notch 84c on the rim of the disk. Each of the cam channels 84a and 84b is divided into four quadrants, Quadrant I, Quadrant II, Quadrant III and Quadrant IV, each quadrant corresponding to a particular action of the apparatus 10. The stop notch 84c is located about 25 degrees before the beginning of Quadrant I. This location is not critical as long as both cam followers 86 and 100 are in regions of the cam channels 84a and 84b where the cam followers are not being moved. As indicated by an arrow 104, the direction of rotation is counter-clockwise. Hence, about 25 degrees after the cam disk 84 begins to rotate, Quadrant I is entered. In Quadrant I, the blade holder plate 32 is moved toward the wire 12 (FIG. 1), and the knives 20 and 22 not moved at all or may be closed slightly. In Quadrant II, the plate 32 is not moved and the blades 20 and 22 are closed to a predetermined spacing so as to cut the insulation 14 but not the conductor 18 within. In Quadrant III, while maintaining the blades 20 and 22 in their closed position, the plate 32 is pulled back from the wire 12, thus pulling off the portion of insulation 14 that was cut. The blades 20 and 22 are not moved during this portion of the rotation, or they may be opened only slightly. Finally, in Quadrant IV, the plate 32 is not moved and the blades 20 and 22 are opened fully.

Figure 9:
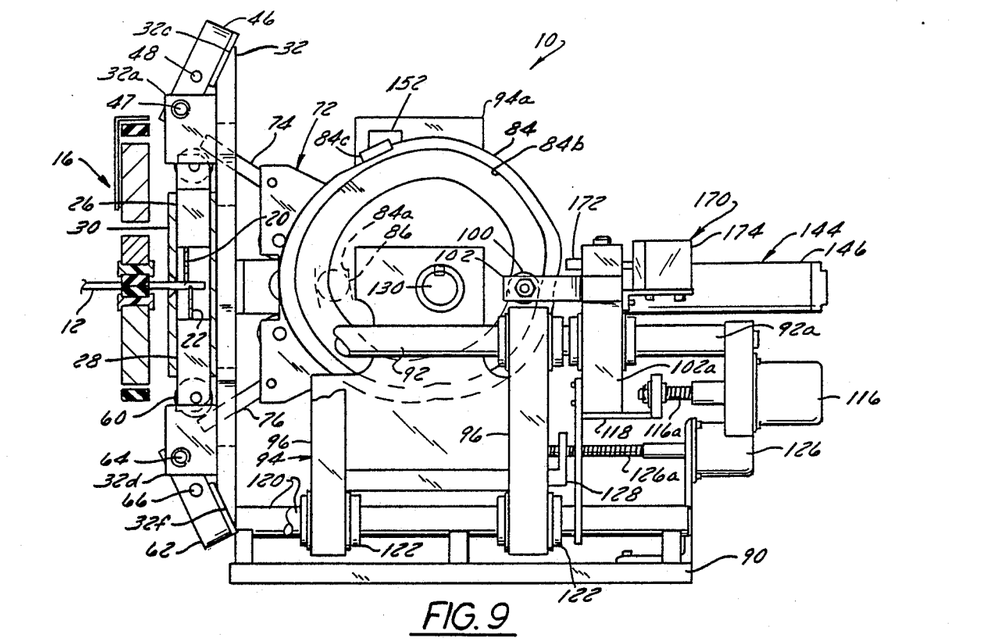
FIG. 9 is a side view of the apparatus shown in FIG. 1, but showing the cam disk and associated apparatus in a different operative position.
Figure 10:
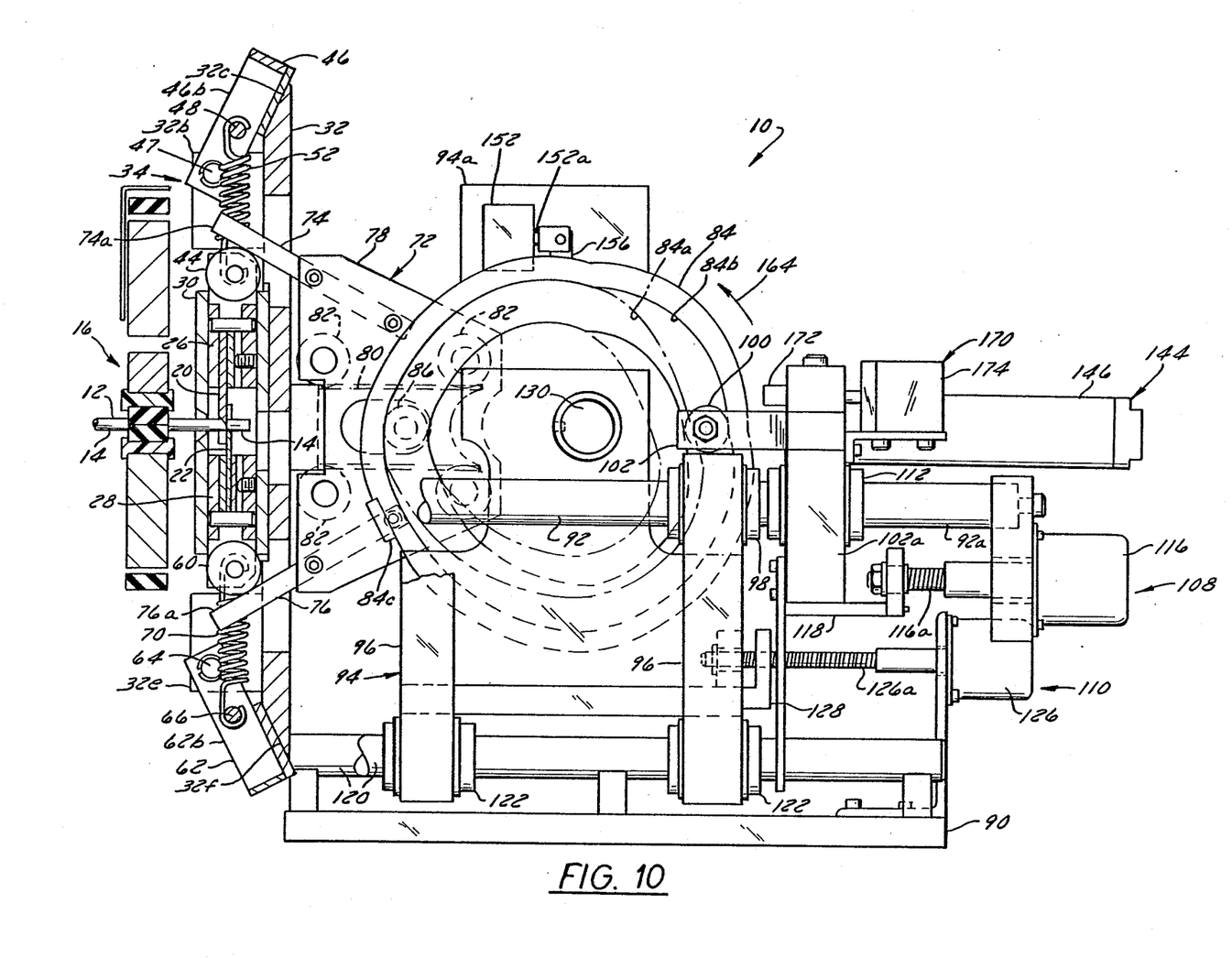
FIG. 10 is a side view of the apparatus shown in FIG. 1, but showing the cam disk and associated apparatus in another different operative position.
Figure 11:
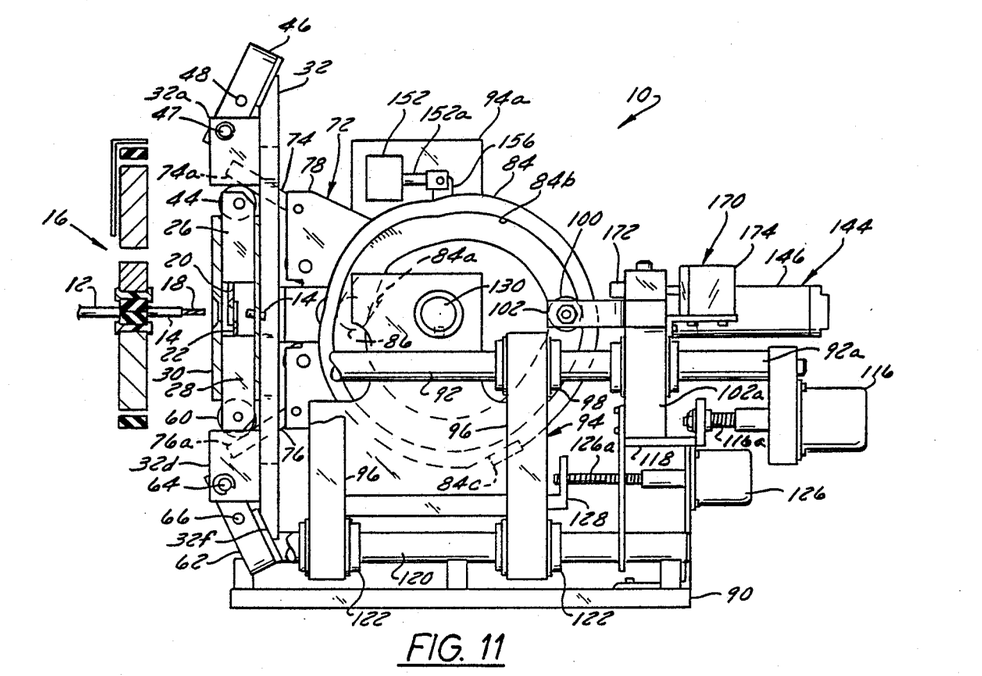
FIG. 11 is a side view of the apparatus shown in FIG. 1, but showing the cam disk and associated apparatus in yet a different operative position.

These steps can also be seen by reference to the apparatus in its various positions, as shown in FIGS. 1, 9, 10 and 11. FIG. 1 shows the apparatus with the knives 20 and 22 open, and with the blade holder plate 32 pulled back. This is the zero position, that is, the position from which the apparatus 10 begins any cycle. In FIG. 9, the apparatus 10 is in the second position, just after Quadrant I of FIG. 8. In this position the plate 32 is forward, and the blades 20 and 22 are still at least mostly open. FIG. 10 shows the apparatus 10 in the third position, just after Quadrant II of FIG. 8. Here the plate 32 has remained forward, the ramp carrier 78 has also moved forward, and hence the blades have closed fully to cut the insulation 14. Finally, FIG. 11 shows the fourth position, just after Quadrant III of FIG. 8. In this figure the blades 20 and 22 are still closed, and the plate 32 is drawn back so as to pull the cut insulation off the wire 12, exposing the conductor 18. After the apparatus 10 has passed the fourth position as shown in FIG. 11, Quadrant IV of the cam channels, as shown in FIG. 8, in its first approximately 65 degrees of rotation, returns the apparatus to the first or zero position as shown in FIG. 1, about 25 degrees before the beginning of Quadrant I, as indicated by an arrow 106. In this position the apparatus 10 is ready to begin another cycle as soon as another wire 12 is moved into position by the conveyor 16.

Adjustments

In order to accommodate various thicknesses of wire and various types of terminals to be attached to the wire, the apparatus 10 must be adjustable both as to the length of the insulation to be stripped from the wire and as to the spacing between the knives 20 and 22 when closest together. Accordingly, referring mainly to FIG. 1, the apparatus 10 is provided with means 108 for adjusting the closest separation of the knives 20 and 22, and with means 110 for adjusting the length of insulation to be stripped from the wire 12.

Adjustment of Knife Separation

In the preferred embodiment of the invention, the means 108 for adjusting the closest separation of the knives 20 and 22 includes the blade moving cam follower 100, the coupling arm 102 and the slider rod 92a to which the cam follower 100 is coupled. In this embodiment, the coupling arm 102 is slidably attached to slider rod 92a by insertion of the rod through a hole bored horizontally in a slider portion 102a of the arm 102, that is, the portion of the arm 102 opposite where the wheel 104 is attached. Bearing means such as a bushing 112 may be provided to improve the sliding action of the slider 102a with respect to the rod 92a.

Means 114 are provided for causing sliding of slider 102a with respect to the rod 92a. This means 114 preferably includes a stepper motor 116 non-slidably affixed to the rod 92a, preferably at the end of the rod opposite the end to which the blade holder plate 32 is attached to the rod. The stepper motor of course includes a driven shaft 116a, which is caused to rotate by the motor 116. A bracket 118 is attached to the slider 102a, and extends toward the shaft 116a of the stepper motor 116. The shaft 116a is threaded, and engages in a tapped hole in the bracket 118. Accordingly, as the shaft 116a is driven by motor 116, the rod 92a is caused to slide relative to the cam follower 100.

During normal operation, of course, the relative sliding is not allowed to occur, because the motor 116 is not energized. The adjustment is normally carried out between wires. The effect of this movement is to change the relation, when the cam disk 84 is at its zero point, between the ramp carrier 78 and the blade holder plate 32. This in turn changes the separation between the blades 20 and 22 at the zero point, that is, the separation between cycles. Since the stroke of the blades 20 and 22 is fixed by the amount of movement caused by the cam channel 84a, this also controls the minimum separation between the blades during a cycle.

Control apparatus (not shown), such as logic circuits and so on, may be provided so as to automatically control the servo motor 116, thereby automatically adjusting the separation between knives 20 and 22 to a different value, that is, to adjust for a different gauge of wire, for each wire processed, if desired.

Adjustment of Length of Strip

Also in the preferred embodiment, still referring mainly to FIG. 1, means 110 for adjusting the length of insulation to be stripped from the wire 12 includes uprights 96 and base 90. Immovably secured to the base 90 are a pair of support rods 120, preferably arranged parallel to and directly beneath slider rods 92. Prior to attachment to the base 90, each of these support rods 120 is slidably axially inserted through holes bored transversely in the bottom ends of two of the uprights 96. As with the other similar sliding attachments disclosed herein, it may be desirable to provide bearing means such as bushings 122 within the bored holes in the uprights 96 so as to improve the sliding action of the uprights with respect to the rods 120.

Means 124 are provided for causing sliding of uprights 96 with respect to the support rods 120. Similar to means 114, means 124 preferably includes a second stepper motor 126, again having a driven shaft 126a projecting therefrom. Stepper motor 126 is affixed to base 90, or alternatively to one of the support rods 120. A bracket 128 is affixed to one of the uprights, and extends toward the shaft 126a. The shaft 126a is threaded, and engages in a tapped hole in the bracket 128. Hence, as the shaft 126a is driven by motor 126, the attached upright 96, and along with it the frame 94, the cam disk 84, the blade holder plate 32, and the rest of the apparatus 10, is caused to slide relative to the rod 120, and hence relative to the base 90 and the rest of the conveyor 16.

During normal operation the relative sliding is not allowed to occur, because the motor 126 is not energized. Similar to the above adjustment of the closest separation of the knives 20 and 22, this adjustment is normally carried out between wires. Moving the starting point of the blade holder plate 32, as is done by this adjustment, changes the distance between the plate 32 and the conveyor 16, which has the desired effect of changing the amount of insulation removed in the stripping operation.

Control apparatus (not shown), such as logic circuits and the like, may be provided so as to automatically control the motor 126, thereby adjusting the length of the removed insulation, and thus the exposed conductor 18, to a different value for each wire processed, if desired.

Prime Mover Means

Figure 12:
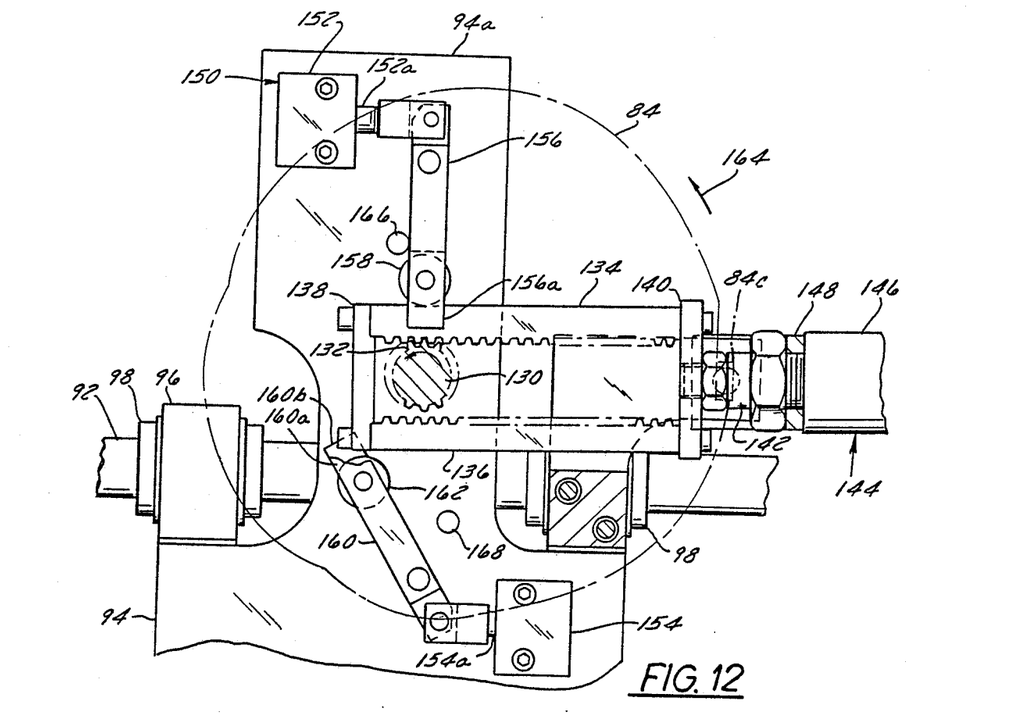
FIG. 12 is a cross-sectional view of the apparatus shown in FIG. 3, taken generally along line 12—12, showing a mechanism for driving the cam disk, constructed according to one embodiment of the invention.
Figure 13:
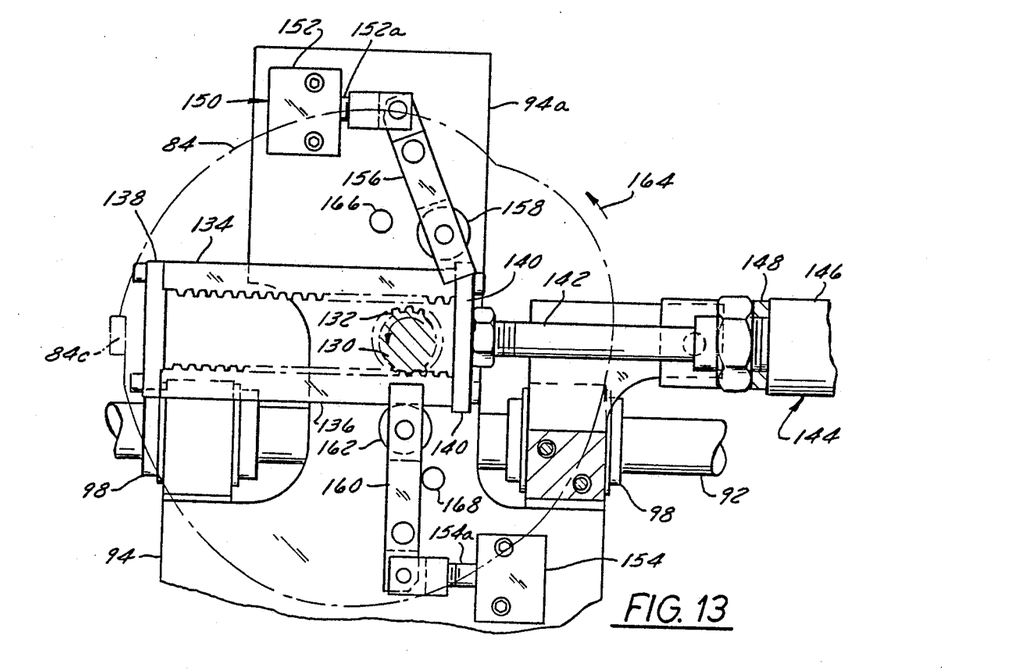
FIG. 13 is a cross-sectional view of the apparatus similar to FIG. 12, showing the driving mechanism in a different operative position.

As indicated above, during operation, the cam disk 84 is rotated by a suitable prime mover. One embodiment of prime mover is shown in the attached- drawing figures. Referring now mainly to FIGS. 3, 12 and 13, cam disk hub 84d is connected to or integrally formed with a cam shaft 130, which projects axially from one side of the cam disk 84, preferably the side having cam channel 84a. The cam shaft 130 is journaled in an upper portion 94a of the frame 94. Affixed on the shaft 130 is a toothed gear 132. A pair of facing toothed racks, an upper rack 134 and a lower rack 136, are placed over the cam shaft 130 in line with the gear 132 and affixed together by end brackets 138 and 140. The teeth of the racks 134 and 136 match the teeth of the gear 132, so that the gear and the racks may be engaged. The racks 134 and 136 are spaced apart, with the spacing between them being just greater than the diameter of the gear 132, so that the gear 132 fits between the racks but may rotate when engaged with one of the racks without interference from the other of the racks.

One of the end brackets 140 is affixed to the rod 142 of a main power cylinder 144, the body 146 of which is attached pivotably to the frame 94 via a mounting bracket 148 as shown in FIG. 3. Energizing the main cylinder 144 causes the racks 134 and 136 to move with respect to the frame 94. If one of the racks 134 and 136 is engaged with the gear 132, movement of the racks causes the gear, and hence the cam shaft 130 and indeed the cam 84 itself, to rotate.

Rack switching means 150 is provided to control and change which of the racks 134 and 136 is engaged with the gear 132. In the disclosed embodiment, the rack switching means 150 includes an upper power cylinder 152 and a lower power cylinder 154. These cylinders 152 and 154 may be any suitable power cylinders, such as air cylinders or solenoids. Both cylinders 152 and 154 are attached to the upper portion 94a of the frame 94, and the cylinders are arranged such that their rods 152a and 154a respectively are approximately parallel to the rod 142 of the main cylinder 144. One cylinder 152 is mounted above the cam shaft 130, while the other cylinder 154 is mounted below. The lower cylinder 154 faces the same direction as the main cylinder 144, while the upper cylinder 152 faces the opposite way.

Upper rod 152a has a distal end which is connected to an upper lever 156. Upper lever 156 is pivotably attached to the rod 152a and also, at a point just below its attachment to the rod, it is pivotably attached to the upper frame portion 94a. Upper lever 156 has a distal end which is forked, having two tines 156a and 156b. The upper lever 156 has rotatably attached between its tines a bearing means, such as a roller 158. The roller 158 is sized and positioned so that the ends of the tines 156a and 156b reach beyond the roller. Further, the roller 158 is positioned so that it bears on the upper rack 134.

Similarly, lower rod 154a has a distal end which is connected to a lower lever 160. Lower lever 160 is pivotably attached to the rod 154a and also, at a point just above its attachment to the rod, it is pivotably attached to the upper frame portion 94a. Lower lever 160 has a distal end which is forked, having two tines 160a and 160b. The lever 160 has rotatably attached between its tines 160a and 160b a bearing means, such as a roller 162. The roller 162 is sized and positioned so that the ends of the tines 160a and 160b reach beyond the roller. Further, the roller 162 is positioned so that it bears on the lower rack 136.

The upper tines 156a and 156b and the lower tines 160a and 160b are spaced apart to match the width of the rollers 158 and 162 to that of the racks 134 and 136, so as to ensure that the rollers bear directly on the respective racks.

This prime mover operates by imparting one entire revolution to the gear 132, and thus the cam disk 84, with each full movement of the main cylinder rod 142. That is, cam disk 84 rotates one full revolution when the rod 142 is expelled all the way from the main cylinder 144, while another full revolution is imparted on the return movement of the rod 142. Since the cam disk 84 must always rotate in the same direction, in this case counter clockwise as shown by an arrow 164, the rack switching means 150 must change the rack 134 or 136 engaged with the gear 132 between each movement of the main cylinder 144. As shown in FIG. 12, the upper rack 134 is engaged with the gear 132 for one revolution, that is, for a single stroke of main cylinder 144, while the rod 142 is extended from the cylinder. In order to switch racks, and thus to have the lower rack 136 engaged after the main cylinder 144 has moved the racks to the position shown in FIG. 13, the upper cylinder 152 first retracts its rod 152a. This causes the upper lever 156 to assume the position shown in FIG. 13, moving the upper roller away from the upper rack 134. Then the lower cylinder 154 extends its rod 154a, causing the lower lever 160 to move into the position as shown in FIG. 13, where the lower roller 162 contacts the lower rack 136. This causes the lower rack 136 to move upward and engage the gear 132. Then when the main cylinder 144 retracts its rod 142, the gear 132 and hence the cam disk 84 makes another full counter clockwise revolution. Thereafter, lower cylinder 154 again retracts its rod 154a, upper cylinder 152 extends its rod 152a, upper rack 134 is engaged with the gear 132, and the prime mover is ready to rotate the cam disk counter clockwise again.

In order to prevent the levers 156 and 160 from moving with the racks 134 and 136 when in contact, each lever is provided with stop means for stopping the lever from pivoting too far. Accordingly, upper lever 156 is provided with a stop 166, positioned on the upper frame 94a so as to stop the lever from pivoting beyond the vertical position shown in FIG. 12 when the upper lever is causing the upper rack 134 to engage the gear 132. Similarly, lower lever 160 is provided with a stop 168, positioned on the upper frame 94a so as to stop the lever from pivoting beyond the vertical position shown in FIG. 13 when the lower lever is causing the lower rack 136 to engage the gear 132.

Cam Disk Stop Means

In order to ensure that the cam disk 84 is always in exactly the same position between revolutions, referring now to FIGS. 1 and 14, it is desirable to provide means 170 for stopping the rotation of the cam disk 84 exactly at the zero point after every revolution. This stop means 170 operates on the stop notch 84c of the cam disk 84, and includes a generally triangular shaped latch 172 pivotably attached to any suitable surface near the cam disk. In the embodiment disclosed herein, the latch 172 is attached to the coupling arm 102. The latch 172 is movable between a latched position as shown in solid lines in FIG. 14, and an unlatched position as shown in phantom. In its latched position, the latch 172 has one portion thereof moved toward the cam disk 84 so that the stop notch 84c contacts the latch, thereby preventing rotation of the cam disk. In its unlatched position, the latch 172 is pivoted away from the cam disk 84, allowing it to rotate freely. The stop means 170 further includes a latch power cylinder 174, such as a solenoid or air cylinder, also attached to the coupling arm 102.

The latch cylinder 174 is arranged such that its rod 174a is attached to the latch 172 to cause the pivoting of the latch as described to allow the cam disk 84 to rotate or prevent it from rotating.

Hence, each time a rotation of the cam disk 84 is desired, the rod 174a of the latch cylinder 174 is retracted. Then the prime mover causes the cam disk 84 to begin to rotate. As soon as the stop notch is cleared, the rod 174a may be extended again, so as to be in position to stop the rotation of the cam disk 84 when the stop notch comes around again.

While the apparatus hereinbefore described is effectively adapted to fulfill the aforesaid objects, it is to be understood that the invention is not intended to be limited to the particular preferred embodiments of wire processing apparatus herein set forth. Rather, it is to be taken as including all reasonable equivalents without departing from the scope of the appended claims.

We claim:

1. A programmable apparatus for automatically stripping insulation from a wire end being conveyed by a wire conveyor, thereby leaving a portion of exposed conductor, comprising:
   A. insulation cutting means for transversely cutting said insulation to provide a cut portion of insulation, including of said blades being movable toward the other by blade closing means to effect transverse cutting of said insulation;
   B. insulation moving means for axially moving said cut portion of insulation relative to said conductor to effect stripping, including means for moving said cutting means toward said wire end and positioning said wire end between said blades, and for moving said cutting means away from said wire end after said blades have been closed on said wire end and said insulation has been cut, for effecting stripping of said wire end;
   C. depth control means for controlling the depth to which said cutting means cuts said insulation; and
   D. length control means for controlling the length of said cut portion; means including:
   E. said means for moving said cutting
   (1) a blade holder for holding said cutting blades in position, means and
   (2) slider means connected to said holder slidably engaged in a support frame connected to said conveyor, by first
   (3) cam means connected to said slider means cam follower means and rotatably connected to said support frame for moving said slider means and thus said blade holder to any one of a number of predetermined positions as required to effect stripping of said wire end, and
   (4) prime mover means for rotating said cam means within said support frame, said cam means includes a cam disk having on one side thereof a first cam surface, said cam disk being rotatably attached to said support frame, and said first cam follower means being adapted to follow said first cam surface, said depth control means includes means for shifting said cam follower means with respect to said slider means, said shifting means includes a servo motor which is affixed between said cam follower means and said slider means, said servo motor having a drive shaft, said drive shaft being threaded and connected such that, when said drive shaft is caused to rotate by said servo motor, said slider means is shifted with respect to said cam follower means.

2. An apparatus as recited in claim 1 further comprising stop means for stopping the rotation of said cam means at a predetermined zero position of said cam rotation, and means for releasing said stop means to allow said cam means to rotate.

3. An apparatus as recited in claim 1 further comprising blade biasing means for biasing said blade closing means toward an open position.

4. An apparatus as recited in claim 3 wherein said blade closing means includes
   blade moving means for moving said blades toward each other;
   cam follower means for connecting said blade moving means to a second cam surface on a side of said cam disk opposite said first cam surface, for moving said blades toward each other and away from each other as said cam rotates.

5. An apparatus as recited in claim 4 wherein said support frame is connected to said conveyor by means of a base, to which said support frame is slidably connected, and wherein said length control means includes means for sliding said support frame with respect to said base.

6. An apparatus as recited in claim 5 wherein said sliding means includes a first servo motor affixed between said base and said support frame, said first servo motor having a drive shaft, said drive shaft being threaded and connected such that, when said shaft is caused to rotate by said first servo motor, said support frame slides with respect to said base.

7. A programmable apparatus for automatically stripping insulation from a wire end being conveyed by a wire conveyor, thereby leaving a portion of exposed conductor, comprising:
   A. insulation cutting means for transversely cutting said insulation to provide a cut portion of insulation, including opposed blades having facing cutting surfaces, at least one of said blades being movable toward the other by blade closing means to effect transverse cutting of said insulation;
   B. insulation moving means for axially moving said cut portion of insulation relative to said conductor effect stripping, including means for moving said cutting means toward said wire end and positioning said wire end between said blades, and for moving said cutting means away from said wire end after said blades have been closed on said wire end and said insulation has been cut, for effecting stripping of said wire end;
   C. depth control means for controlling the depth to which said cutting means cuts said insulation; and
   D. length control means for controlling the length of said cut portion;
   E. said means for moving said cutting means including:
   a blade holder for holding said cutting blades in position,
   slider means connected to said holder means and slidably engaged in a support frame connected to said conveyor,
   cam means and connected to said holder means by first cam follower means and rotatably connected to said support frame for moving said slider means and thus said blade holder to any one of a number of predetermined positions as required to effect stripping of said wire end, and prime mover means for rotating said cam means within said support frame, F. said prime mover means includes:
- a prime mover power cylinder connected to said support frame and having a rod slidably mounted therein;
- a pair of racks affixed axially to a distal end of said rod and arranged opposite each other, each of said racks having gear teeth on a surface of said respective rack facing the opposite rack;
- a gear affixed to a cam shaft which in turn is connected to a center point of said cam disk and projecting axially outward therefrom, such that said gear is located between said racks, said gear having teeth that match the teeth of said racks; and
- means for forcing engagement of one of said racks with said gear, and for disengaging said gear from said racks;
- such that when said prime mover power cylinder is energized, said cam disk rotates.

8. An apparatus as recited in claim 7 wherein said engagement means includes a lever pivotably attached such that one end is in proximity to the side of each said rack opposite the teeth of said rack, and a power cylinder connected to the opposite end of each of said lever for forcing pivoting of each lever on energizing said power cylinder, which in turn forces engagement of the respective rack with said gear.

* * * * *